(12) United States Patent
Quest et al.

(10) Patent No.: US 7,565,830 B2
(45) Date of Patent: Jul. 28, 2009

(54) SYSTEM, METHODS, AND COMPOSITIONS FOR DETECTING AND INHIBITING LEAKS IN ENGINE OIL SYSTEMS

(75) Inventors: William J. Quest, Dallas, TX (US); Darrell W. Patton, Andover, KS (US)

(73) Assignee: E.F. Products, Garland, TX (US)

( * ) Notice: Subject to any disclaimer, the term of this patent is extended or adjusted under 35 U.S.C. 154(b) by 529 days.

(21) Appl. No.: 11/253,078

(22) Filed: Oct. 18, 2005

(65) Prior Publication Data
US 2007/0084269 A1     Apr. 19, 2007

(51) Int. Cl.
*G01M 3/04* (2006.01)
*C10M 137/10* (2006.01)
*C09K 3/10* (2006.01)
*C09K 11/06* (2006.01)
*G01N 21/00* (2006.01)

(52) U.S. Cl. .................. 73/40.7; 508/433; 508/579; 508/485; 508/591; 508/482; 106/33; 422/55; 422/61; 422/71; 252/68; 252/71; 252/72; 252/73; 252/77; 252/79; 252/301.16

(58) Field of Classification Search .......... 508/433, 508/579, 485, 591, 482; 106/33; 252/68, 252/72, 73, 77, 71, 79, 301.16; 73/40.7; 422/55, 61, 71
See application file for complete search history.

(56) References Cited

U.S. PATENT DOCUMENTS

| | | | |
|---|---|---|---|
| 4,662,940 A | 5/1987 | Monier | |
| 5,149,453 A * | 9/1992 | Parekh | .................. 252/68 |
| 5,918,269 A | 6/1999 | Mahaffey, Jr. | |
| 5,979,226 A | 11/1999 | Cavestri et al. | |
| 6,070,454 A | 6/2000 | Cavestri | |
| 6,070,455 A | 6/2000 | Cavestri | |
| 6,101,867 A | 8/2000 | Cavestri | |
| 6,150,306 A | 11/2000 | Friswell | |
| 6,165,384 A | 12/2000 | Cooper et al. | |
| 6,170,320 B1 | 1/2001 | Scaringe et al. | |
| 6,786,960 B2 | 9/2004 | Profetto | |
| 6,840,990 B2 | 1/2005 | Gallagher et al. | |
| 2005/0019236 A1 * | 1/2005 | Martin et al. | ............. 422/255 |
| 2005/0269840 A1 * | 12/2005 | Finerman et al. | ............. 296/210 |

FOREIGN PATENT DOCUMENTS

WO       WO 92/07249       4/1992

OTHER PUBLICATIONS

Co-pending U.S. Appl. No. 11/253,068 entitled "Systems, Methods, and Compositions for Detecting and Inhibiting Leaks in Transmission Systems," to Quest et al., filed Oct. 18, 2005; available in the private Patent Application Information Retrieval database.
Co-pending U.S. Appl. No. 11/253,076 entitled "Systems, Methods, and Compositions for Detecting and Inhibiting Leaks in Steering Systems," to Quest et al., filed Oct. 18, 2005; available in the private Patent Application Information Retrieval database.

* cited by examiner

*Primary Examiner*—Glenn A Caldarola
*Assistant Examiner*—Vishal Vasisth
(74) *Attorney, Agent, or Firm*—Meyertons, Hood, Kivlin, Kowert & Goetzel, P.C.; Eric B. Meyertons

(57) ABSTRACT

System, methods, and compositions are described for detecting and inhibiting leaks of an engine oil system. The composition may include an engine oil system sealant and a light activated compound. The engine oil system sealant(s) inhibit leak(s) in the engine oil system. One or more of the light activated compounds are visible when an activating light source is directed towards a portion of the engine oil system.

22 Claims, No Drawings

SYSTEM, METHODS, AND COMPOSITIONS FOR DETECTING AND INHIBITING LEAKS IN ENGINE OIL SYSTEMS

BACKGROUND

1. Field of the Invention

The present invention relates generally to sealing and detecting leaks. More particularly, the invention relates to systems, methods, and compositions for sealing and detecting leaks in an engine oil system.

2. Description of the Relevant Art

Leak detection methods have been developed to analyze fluid systems, such as climate control systems, hydraulic systems, engine oil systems, transmission systems, fuel systems, brake systems, or radiator coolant systems using dyes that fluoresce or phosphoresce. These dyes may be added to the system, circulated through the system, and then visualized using a light source. Once the origin of the leak is determined, the leak may be repaired mechanically or a sealant may be added to the system to stop the leak.

Sealant compositions and dyes are described in U.S. Pat. No. 4,662,940 to Monier; U.S. Pat. No. 5,918,269 to Mchaffey, Jr.; U.S. Pat. No. 5,979,226 to Cavestri; U.S. Pat. No. 6,070,454 to Cavestri; U.S. Pat. No. 6,070,455 to Cavestri; U.S. Pat. No. 6,101,867 to Cavestri; U.S. Pat. No. 6,150,306 to Friswell; U.S. Pat. No. 6,165,384 to Cooper et al.; U.S. Pat. No. 6,170,320 to Scaringe et al.; U.S. Pat. No. 6,786,960 to Profetto; and U.S. Pat. No. 6,840,990 to Gallagher et al., all of which are incorporated herein by reference.

SUMMARY

Systems, methods, and compositions are described herein for treating engine oil systems so that leaks may be detected and/or sealed. In some embodiments, the composition may include a carrier fluid, an engine oil system sealant, and a light activated compound. The engine oil system sealant may at least partially seal leaks in the engine oil system during use. The light activated compound may be visible to the human eye when activated with an activating light source. The light activated compound may fluoresce when treated with activating light.

Engine oil systems may be treated with a composition by the methods described herein. A composition may be introduced into the engine oil system. The composition may include an engine oil system sealant and a light activated compound. After introduction of the composition, the engine oil system may be operated for a period of time. Activating light may be directed towards at least a portion of the engine oil system to detect any light activated compound leaking from the engine oil system.

In some embodiments, activating light may be directed towards at least a portion of the exterior of the engine oil system after inhibiting one or more leaks detected during a previous inspection of the engine oil system In some embodiments, the composition may be provided as a kit. The kit may include an activating light source.

DETAILED DESCRIPTION

Systems, methods, and compositions described herein relate to sealing and detecting of leaks in engine oil systems. "Engine oil system" refers to an engine block, rocker arms, springs, rods, valve cover, intake port, oil pan, oil sump, intake and exhaust valves, head, and gaskets. The engine oil system may include, but is not limited to, internal combustion engines (e.g., diesel engines, gasoline engines, and gasoline/electric engines) and/or external combustion engines (e.g., steam engines).

Engine oil systems may exhibit leaks that may be observed by the human eye. For example, droplets of engine oil may be observed on a surface of a component of the engine oil system and/or on a surface beneath the engine oil system (e.g., the ground, an asphalt surface, a cement surface, and/or a tile surface). In some embodiments, engine oil systems may exhibit leaks that may not be readily detected by the human eye. For example, fluid from leaks that develop when the engine system is being operated may disperse into the air without being detected. Leaks in an engine oil system may result in diminished engine performance. Poor engine performance may cause engine failure or diminish the efficiency of engine. Diminished engine efficiency may impact the fuel economy of the engine oil system.

Leaks may be inhibited in engines oil systems by replacement of seals, gaskets, or other engine components. Replacement of engine oil system components may be expensive and/or time consuming. The ability to inhibit or stop a leak without replacement of engine components may allow an engine to be operated without loss of time ("downtime") due to repairing the engine. Limited downtime may enhance productivity of commercial operations that rely on engine oil systems for transportation and/or power.

In some embodiments, after the engine has been operated for a period of time and after repairing a leak in the engine oil system, an area around the engine oil system may be inspected (e.g., by looking for oil droplets) to determine if the leak has ceased. Alternatively, alight activated compound may be added to the engine oil system, circulated through the system, and detected using an activating light source. An activating light source includes, but is not limited to, sunlight and/or an ultraviolet (UV) light source. If no oil droplets and/or dye visualization is observed, the leak is determined to be stopped.

Early detection of a different leak in the engine oil system or of a leak from the same area in the engine oil system may prevent lost time and/or expensive repairs. Typically, most dyes used for detection decompose and/or vaporize after the engine is operated for a period of time. In some embodiments, a light activated compound may be used that is not substantially decomposed and/or vaporized under typical engine oil operating conditions.

In some embodiments, a composition that includes an engine oil system sealant and a light activated compound may be used to detect and seal one or more leaks in the engine oil system. "Sealant" refers to a compound, a mixture of compounds, particles, or combinations thereof that inhibit passage of liquid and/or gas from one area to a different area. The composition may include a carrier fluid, an engine oil system sealant, and a light activated compound. The composition may also include additives such as pour point depressants, viscosity modifiers, friction modifiers, extreme pressure additives, dispersants, antifoamants, metal deactivators, surfactants, preservatives, corrosion inhibitors, antioxidants, fragrances, visible dyes, or mixtures thereof.

A carrier fluid may include fluids that are compatible with engine oil and fuel used in the engine oil system. Examples of carrier fluids include, but are not limited to, hydrocarbons, refined petroleum compounds, alcohols, polyalcohols (e.g., polyalkylene glycol (PAG)), esters, polyol esters, alcohol ethers, poly-alpha olefins (PAO), silicone fluids, or mixtures thereof.

Hydrocarbons include compounds that are composed of compounds that contain only hydrogen and carbon. In some embodiments, hydrocarbons include compounds having at least five carbon atoms. In some embodiments, hydrocarbons may have a carbon number from 5 to 50, from 10 to 40, or from 20 to 30. Hydrocarbons include, but are not limited to, alkyl compounds, olefins, aryl compounds, cyclic compounds, or mixtures thereof. Examples of hydrocarbons include, but are not limited to, hexane, toluene, substituted toluene, benzene, substituted benzenes, cycloparaffins, cyclohexanes, naphthalene, octanes, iso-octane, or mixtures thereof. In some embodiments, the composition may include from about 0.1 grams to about 99 grams, from about 1 gram to about 90 grams, from about 10 grams to about 80 grams, from about 20 grams to about 70 grams, from about 30 grams to about 60 grams, or from about 40 grams to about 50 grams of hydrocarbons per 100 grams of composition.

Refined petroleum compounds include compounds that have been produced from hydrocarbon sources (e.g., oil). In some embodiments, refined petroleum compounds may include, but are not limited to, hydrocarbons, compounds containing heteroatoms (e.g., sulfur, nitrogen, or phosphorus), compounds having a carbon number of at least 1, or mixtures thereof. In some embodiments, refined petroleum compounds include a mixture of cycloparaffins and aromatics (e.g., naphthenic oils). For example, refined petroleum compounds may include greater than 80 grams, greater than 90 grams, or greater than 99 grams of naphthenic oil per 100 grams of refined petroleum compounds. In some embodiments, the refined petroleum compounds may have a viscosity in a range from about 50 SUS to about 150 SUS, from about 75 SUS to about 125 SUS, or from about 90 SUS to about 110 SUS at 100° C.

Poly-alpha olefins include compounds having a molecular weight from about 600 to about 3,000,000 and result from the polymerization of one or more alpha-olefins. Examples of alpha-olefins that may be converted to poly-alpha olefins include, but are not limited to, ethylene, propylene, 1-butene, 1-pentene, 4-methyl-1-pentene, 1-hexene, or mixtures thereof. In some embodiments, the composition may include from about 0.01 grams to about 50 grams, from about 0.1 grams to about 30 grams, or from about 1 gram to about 20 grams of poly-alpha olefins per 100 grams of composition.

"Alcohols" refer to compounds having at least one hydroxy (OH) group. In some embodiments, alcohols include compounds having the general formula of $C_nH_{2n+1}OH$, where n is at least 1. Examples of alcohols include, but are not limited to, methanol, ethanol, propanol, iso-propanol, butanol, sec-butanol, tert-butanol, or mixtures thereof. In some embodiments, alcohols may be combined with a carrier fluid to enhance solubility and/or dispersion of an engine oil system sealant, a light activated compound, additives, or mixtures thereof combined in the carrier fluid.

"Esters" refer to compounds or mixtures of compounds having the general formula of $RCO_2R'$ where R and R' are alkyl and/or aryl. Examples of esters include, but are not limited to, methyl acetate, ethyl acetate, stearin, palmitin, methyl butanoate, methyl salicylate, methyl benzoate, ethyl methanoate, ethyl butanoate, pentyl ethanoate, pentyl pentanoate, pentyl butanoate, octyl ethanoate, methyl stearate, esters of dicarboxylic acids, or mixtures thereof. Examples of esters of dicarboxylic acids include, but are not limited to alkyl or aryl esters formed from: phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, alkenyl malonic acids, 1,2-benzenedicarboxylic acid diisononyl ester, or mixtures thereof. Esters may be combined with a carrier fluid to enhance solubility and/or dispersion of an engine oil system sealant, light activated compounds, additives, or mixtures thereof that are combined with the carrier fluid. Esters may, in some embodiments, be used as a fragrance in the composition. In some embodiments, the composition may include from about 0.01 grams to about 50 grams, from about 0.1 grams to about 30 grams, or from about 1 gram to about 20 grams of ester per 100 grams of composition.

Polyol esters include, but are not limited to, glycerol esters, sorbitan esters, pentaerythritolesters, trimethylolpropane esters, or mixtures thereof. In some embodiments, the composition may include from about 0.01 grams to about 50 grams, from about 0.1 grams to about 30 grams, or from about 1 gram to about 20 grams of esters per 100 grams of composition.

In some embodiments, esters may include phosphate esters. Examples of phosphate esters include, but are not limited to, dialkyl phosphate esters, alkyl diaryl phosphate esters (e.g, 2-ethylhexyl diphenyl phosphate or isodecyl diphenyl phosphate), diaryl phosphate esters, triarylphosphate esters (e.g., tricresyl phosphate or isopropylated triphenyl phosphate ester), butylated triphenyl phosphate ester (e.g., tetra-butyl triphenyl phosphate), trimester alkyl phosphate esters (e.g., trisbutoxyethyl phosphate), or mixtures thereof. In some embodiments, esters containing a heteroatom may be used as extreme-pressure additives, anti-wear additives, plasticizers, or flame retardants. In some embodiments, the composition may include from about 0.01 grams to about 50 grams, from about 0.1 grams to about 30 grams, or from about 1 gram to about 20 grams of phosphate esters per 100 grams of composition.

"Alcohol ethers" refer to compounds or a mixture of compounds having the general formula of $H(OCH_2CH_2)_nOR''$, where R" is alkyl and/or aryl, and n is at least 1. Examples of alcohol ethers include, but are not limited to, cellulose ethers, grafted polyol ethers, and ethylene glycol ethers (e.g., glycol propyl ether, ethylene glycol monobutyl ether, or ethylene glycol monobenzyl ether). In some embodiments, alcohol ethers may be combined with a carrier fluid to enhance solubility and/or dispersion of an engine oil system sealant, a light activated compound, additives, or mixtures thereof that are combined in the carrier fluid. In some embodiments, the composition may include from about 0.01 grams to about 50 grams, from about 0.1 grams to about 30 grams, or from about 1 gram to about 20 grams of alcohol ethers per 100 grams of composition.

Antioxidants include, but are not limited to, metal salts of dialkyl dithiophosphates, alkylated diphenyl amines, sulfurized alkylphenols and phenolates, hindered phenols, or mixtures thereof. Metals of metal salts of dialkyl dithiophosphates include, but are not limited to, metals from Columns 6-12 of the Periodic Table (e.g., zinc, cadmium, or molybdenum). "Periodic Table" refers to the Periodic Table as published by the International Union of Pure and Applied Chemistry on Nov. 7, 2003. In some embodiments, the composition may include from about 0.001 grams to about 10 grams, from about 0.01 grams to about 5 grams, or from about 0.1 grams to about 1 gram of antioxidant per 100 grams of composition.

Antifoamants include, but are not limited to, silicones, polysilicones, or mixtures thereof. In some embodiments, the composition may include from about 0.00001 grams to about 1 gram, from about 0.0001 grams to about 0. 1 grams, or from about 0.001 grams to about 0.01 grams of antifoamant per 100 grams of composition.

Corrosion inhibitors include, but are not limited to, metal salts of dialkyl dithiophosphates, metal sulfonate salts, metal phenolate salts, or mixtures thereof. Metals of metal sulfonates and metal phenolates include, but are not limited to, metals from Columns 1 and 2 of the Periodic Table (e.g., calcium, barium, sodium, or magnesium). In some embodiments, the composition may include from about 0.0001 grams to about 10 grams, from about 0.001 grams to about 1 gram, or from about 0.01 grams to about 0.1 grams of corrosion inhibitor per 100 grams of composition.

Dispersants include, but are not limited to, polyisobutylene succinate esters, Mannich Base ashless dispersants, or mixtures thereof. In some embodiments, a polyisobutylene portion of a succinate ester may have a molecular weight ranging from about 500 to about 3,000 or from about 900 to from 2,500. In some embodiments, the composition may include from 0.5 grams to about 10.0 grams or from about 1 gram to about 3 grams of dispersant per 100 grams of composition.

Extreme-pressure additives include, but are not limited to, amine salts of phosphoric acids, dibenzyl polysulfides, di-tert-nonyl polysulfides, didodecyl polysulfides, di-tert-butyl polysulfides, dioctyl polysulfides, diphenyl polysulfides, dicyclohexyl polysulfides, zinc dithiophosphate, molybdenum sulfides, molybdenum organosulfides, or mixtures thereof. Extreme-pressure additives, in some embodiments, may perform as metal-deactivators, anti-wear additives, corrosion inhibitors, and/or friction modifiers. In some embodiments, the composition may include from about 0.01 grams to about 30 grams, from about 0.1 grams to about 20 grams, or from about 1 gram to about 10 grams of extreme-pressure additives per 100 grams of composition.

Friction modifiers may include, but are not limited to, alkane phosphonic acids, alkanols, amides, amines, alkanolamides, alkoxylated amines, alkoxylated ether amines, amine oxides, amidoamines, amino guanidines, amine salts, betaines, borated glycerol monooleates, glycerol esters of dimerized fatty acids, esters of carboxylic acids, esters of anhydrides, fatty acid esters, imidazolines, imines, nitriles, organo-molybdenum compounds, molybdenum dialkyldithiocarbamates, molybdenum dialkyl dithiophosphates, molybdenum disulfide, tri-molybdenum cluster dialkyldithiocarbamates, non-sulfur molybdenum compounds, quaternary amines, or mixtures thereof. Friction modifiers may, in some embodiments, perform as extreme-pressure additives, corrosion inhibitors, metal deactivators, and/or anti-wear additives. In some embodiments, the composition may include from about 0.01 grams to about 10 grams or from about 0.1 grams to about 1 gram of friction modifiers per 100 grams of composition.

Pour point depressants include, but are not limited to, polyacrylates, polymethacrylates, copolymers of ethylene and propylene, or polymers having a molecular weight from about 20,000 to about 120,000. In some embodiments, the composition may include from about 0.01 grams to about 10 grams or from about 0.1 gram to about 1 grams of pour point depressant per 100 grams of composition.

Viscosity modifiers include, but are not limited to, polyisobutylene, copolymers of ethylene and propylene and higher alpha-olefins, polymethacrylates, polyalkylmethacrylates, methacrylate copolymers, copolymers of an unsaturated dicarboxylic acid and a vinyl compound, inter polymers of styrene and acrylic esters, and partially hydrogenated copolymers of styrene/isoprene, styrene/butadiene, and isoprene/butadiene, as well as the partially hydrogenated homopolymers of butadiene and isoprene and isoprene/divinylbenzene. In some embodiments, the composition may include from about 0.01 grams to about 20 grams or from about 1 gram to about 10 grams of viscosity modifier per 100 grams of composition. In some embodiments, viscosity modifiers may function as a dispersant.

Surfactants include, but are not limited to, anionic surfactants, cationic surfactants, non-ionic surfactants, amphoteric surfactants, or mixtures thereof. In some embodiments, surfactants may enhance the miscibility of the composition with the fluid in the engine oil system. Examples of anionic surfactants include, but are not limited to, phenates, salicylates, overbased sulfonates, neutral sulfonates, or linear alkyl benzene sulfonates. Examples of cationic surfactants include, but are not limited to, alkyl pyridinium compounds and/or quaternary ammonium compounds. Examples of amphoteric surfactants include, but are not limited to, imidazolines and betaines. Examples of nonionic surfactants include, but are not limited to, alkyl phenol ethoxylates, alkyl ethoxylates, alkylpolyglycosides, polyhydroxy long-chain carboxylic acid amides, long-chain carboxylic acid salts, sulfonates, phosphonates, sulfate and phosphate-based compounds capable of dissolving in water, or mixtures thereof. "Long-chain carboxylic acids" refer to saturated and unsaturated carboxylic acids having between 6 and 30 carbon atoms. In some embodiments, the composition may include from about 0.01 grams to about 30 grams, from about 0.1 grams to about 20 grams, or from about 1 gram to about 10 grams of surfactant per 100 grams of composition.

Carrier fluids and/or additives are commercially available from Asahi Denka Kogyo K. K. (Japan), Akzo Nobel Chemicals (Netherlands), Chevron Oronite (Houston, Tex. U.S.A.), Chemtura (Middlebury, Conn., U.S.A.), Degussa-RohMax USA (Horsham, Pa., U.S.A.), ExxonMobile Co. (Houston, Tex., U.S.A.), Infineum (United Kingdom), Lubrizol (Cleveland, Ohio, U.S.A.), R. T. Vanderbilt Company, Inc. (Norwalk, Conn.), Shell Chemical Co. (Houston, Tex., U.S.A.), or Shell Oil Co. (Houston, Tex., U.S.A.). In some embodiments, a mixture of carrier fluid, one or more additives, and/or light activated compounds may be commercially available as a formulated package.

"Light activated compounds" refer to a compound or compounds that are visible to the human eye when exposed to activating light (e.g. UV light or sunlight). Light activated compounds may include fluorescent dyes and/or phosphorescent dyes. Fluorescent dyes and/or phosphorescent dyes may have a visible color or may be colorless. Fluorescent dyes that may not be visible to a human eye may be visible when the fluorescent dye is treated with an ultraviolet light. In some embodiments, a light activated compound may remain substantially unchanged when heated up to 1000° C., up to 800° C., up to 600° C., or up to 400° C. Light activated compounds may be available as a solid or a liquid. In some embodiments, the composition may include from about 0.00001 grams to about 10 grams, from about 0.001 grams to about 1 gram, or from about 0.01 grams to about 0.1 gram of light activated compound per 100 grams of composition.

Light activated compounds include, but are not limited to, the following compounds or derivatives of the following compounds: anthracenes, aminoalklyphenothiazines, aminophenylbenzothiazoles, benzothiazolines, benzothiazoles, benzotriazoles, carbazoles, coumarins, diphenylamines, fluoresceins, naphthalenes, naphthalamides, naphthylamides, naphthylimides, phenanthracenes, phenothiazines, perylenes, pyrollidones, phenols, quinolines, isoquinolines, purines, thioxanes, thioxanthanes, and 1,3,4-thiadiazoles. Examples of these compounds include, but are not limited to, coumarin 6; coumarin 7; coumarin 30; coumarin 6H; coumarin 102; coumarin 110; coumarin 152; coumarin 153; coumarin 314; coumarin 334; coumarin 337; coumarin 343; coumarin 480D; coumarin-3-carboxylic acid; 7-(2H-naphtho[1, 2-D]triazol-2-yl)-3 phenylcoumarin; 2-aminobenzothiazole; benzothiazole; N-phenyl-1-naphthylamine; N-phenyl-2-naphthylamine; N-(4-cumylphenyl)-1-naphthylamine; p-tert-dodecylphenyl-2-naphthylamine; 2,2-dimethylbenzothiazoline; bis(benzothiazoline), benzotriazole; methylene bis(dibutyl dithiocarbamate); 2,6-di-tert-butyl-4-methylphenol; 2,5-dimercapto-1,3,4-thiadiazole; dioctyldiphenylamine; didecyldiphenylamine; or 1-methyl-2-pyrollidone. Organic metallics such as molybdenum dialkylphosphorodithioate and zinc octyldithio-phosphate; and inorganic compounds such zinc sulfide and cadmium sulfide also may be used as light activated compounds.

Light activated compounds are commercially available as STAY BRITE® BSL 712, STAY BRITE® BSL 713, STAY BRITE® BSL 714 (Brite Solutions, Troy Mich., U.S.A.), DAY GLOW® TRY-33 (Day Glow Color Corp, Cleveland, Ohio, U.S.A.), R-12 dye (part 16252, SPX Corporation, Robinair, Montpelier, Ohio, U.S.A.), or R-134a dye (part 16253, SPX Corporation, Robinair, Montpelier, Ohio, U.S.A.), D15000 (Chromatech, Inc., Canton, Mich., U.S.A.), Solvent Yellow 43 (Keystone Aniline Corporation, Chicago, Ill., U.S.A.), Other sources for light activated compounds are Aldrich Chemical Co. (Milwaukee, Wis., U.S.A.), and Rohm and Haas (Philadelphia, Pa., U.S.A.).

The composition may include an engine oil system sealant capable of stopping and/or inhibiting the leak. The engine oil system sealant may include material such as polymeric materials, plasticizers, synthetic fibers, cellulose fibers, or combinations thereof. Polymeric material include, but are not limited to, latex, polyvinyl acetate, polyvinyl resins, or mixtures thereof.

Plasticizers include, but are not limited to, phthalate esters, aliphatic dibasic acid esters, trimellitates, pyromellitic acid esters, phosphates, and/or refined hydrocarbons. In some embodiments, a mixture of aromatic hydrocarbons, diisononyl phthalate, and dialkyl phosphate esters may perform as a sealant for the engine system. Examples of phthalate esters such as di(2-ethylhexyl) phthalate, butyl benzyl phthalate, dinonyl phthalate, diisononyl phthalate, diisodecyl phthalate, diundecyl phthalate, diheptyl phthalate, butyl phthalyl, butyl glycolate. Examples of aliphatic dibasic acid esters include dioctyl adipate, didecyl adipate, dioctyl sebacate; polyglycol benzoates such as polyoxyethylene glycol dibenzoate, polyoxypropylene glycol dibenzoate.

In some embodiments, the composition may include from about 1 gram to about 99 grams, from about 10 grams to about 90 grams, from about 20 grams to about 80 grams, from about 30 grams to about 70 grams, or from about 40 grams to about 60 grams of sealant per 100 grams of composition.

The engine oil system sealant may be dispersed or emulsified in the carrier fluid. In some embodiments, the engine oil system sealant may swell when heated in the engine oil system. A swellable material may allow engine oil system sealant of relatively small diameter to be introduced into the engine oil system and not be removed by filters positioned in the engine oil system. The engine oil system sealant may enlarge (swell) as the composition is circulated through the engine oil system.

In some embodiments, visible light activated dyes (e.g., visible dyes such as green, blue or red dyes) may be added to the composition. In some embodiments, dyes may be used to differentiate the composition from other leak detecting and/or leak sealing products. A composition may include up to 1 grams, up to 0.5 grams, or up to 0.01 grams of dye per 100 grams of composition.

A composition may be formed by mixing a carrier fluid, one or more light activated compounds, and one or more engine oil system sealants. In some embodiments, a carrier fluid, one or more additives, one or more light activated compounds, and one or more engine oil sealants may be mixed together. Mixing of the ingredients may be performed at a temperature ranging from about 10° C. to about 200° C., from about 25° C. to about 100° C., or from about 50° C. to about 90° C. The combined ingredients may be mixed for about 0.5 hour, about 1 hour, about 2 hour, or up to 24 hours to form the composition. In some embodiments, the engine oil system sealant may be partially soluble and/or suspended in the composition. Table 1 lists representative ranges of compounds in compositions to detect and seal leaks in an engine oil system.

TABLE 1

| Compound | Volume % (based on total volume of composition) | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Refined Petroleum Compounds | 27 | 21 | 39 | 43 | 47 | 53 | 57 | 62 | 64 | 65 |
| Anti-foamant | — | — | <1 | — | <1 | — | <1 | — | — | — |
| Dispersant | 5 | — | 5 | 5 | 5 | — | — | — | — | — |
| Friction modifier | — | — | — | — | 1 | — | — | — | — | — |
| Ester | — | 20 | 15 | — | 10 | — | 15 | 10 | — | — |
| Phosphate ester | — | 5 | 10 | — | 10 | 20 | — | 10 | 15 | — |
| Alcohol ether | 20 | 30 | 21 | 10 | 10 | 15 | 8 | 5 | 5 | 3 |
| Pour Point Depressant | — | 1 | — | — | — | — | 2 | — | — | — |
| Sealant | 40 | 20 | 5 | 35 | 10 | 10 | 15 | 10 | 15 | 30 |
| Surfactant | 5 | — | — | 5 | 5 | — | — | — | — | — |
| UV dye | 3 | 3 | 1 | 2 | 1 | 2 | 2 | 3 | 1 | 2 |
| Viscosity modifier | — | — | 2 | — | — | — | — | — | — | — |

The composition may be packaged in a clear bottle, colored bottle, or metal can. The bottle may be composed of polymeric material and/or glass. The bottle and/or can may include an end that is tapered. A tapered end may allow the composition to be added directly to a port of the engine oil system. In some embodiments, the composition may be added to a fluid port of the engine oil system using a funnel, a hand pump, or other pressurized pumping system.

In some embodiments, a composition may be sold and/or packaged as part of a kit. The kit may include safety glasses, towels, funnels, an activating light source such as an UV light, or combinations thereof. The kit may be packaged in a carrying case with pre-formed segments to hold the components of the kit. In some embodiments, the carrying case may be plastic and/or include a handle. In some embodiments, the pre-formed segments may be removable.

In some embodiments, an engine oil system may be treated with a composition as described herein to detect and/or seal leaks in the engine oil system. The composition may be added directly to an engine oil system through the engine oil port. In some embodiments, the engine oil system may be treated with the composition at the site of manufacture. Addition of the composition at the site of manufacture may enable leaks that develop during the manufacturing process and/or during shipment of new machinery to be detected and sealed.

In some embodiments, the composition may be pre-mixed with an appropriate engine oil to form an engine oil/composition mixture. Once mixed, the engine oil/composition mixture may be added to the engine oil system though the engine oil addition port.

Once added to the engine oil system, the composition is circulated through the engine oil system for a period of time. For example, the composition may be circulated by starting the engine and operating the engine at least 1 minute, at least 30 minutes, at least 60 minutes, at least 4 hours, at least 8 hours, at least 3 days, at least 4 days, or up to 1 week. After circulating the composition through the engine oil system, activating light (e.g. UV light) may be directed towards a portion (e.g., the exterior) of one or more components of the engine oil system. If a leak was present in the engine oil system, the light activated compound would be visible to the eye when activated by the activating light.

Visualization of the light activated compound(s) under the activating light source may indicate the source(s) of leak(s). Once the source of the leak is detected, the composition may be removed from the site of the source. For example, a person may wipe a cloth over the engine block to remove any fluid from the engine block. The composition may then be continuously circulated through the engine oil system for a period of time. As the composition circulates through the engine oil system, the leak may be sealed with the engine oil system sealant. The leak area may be monitored with the activating light source. Confirmation that the leak is sealed may be obtained by directing activating light towards the engine oil system and noting when little or none of the light activated compound is detected.

In some embodiments, the engine oil system may be monitored for leaks over a period of time. For example, after a period of time and/or a number of miles, UV light may be directed towards the a portion of engine oil system (e.g., towards a portion of the exterior of the engine oil system) to determine if the previously sealed leak is still sealed, or if any new leaks are present. Examples of time periods include, but are not limited to, at least 100 hours, at least 500 hours, at least 700 hours, at least 1,000 hours, at least 1,500 hours, at least 2,000 hours, or at least 30,000 hours. Examples of miles include, but are not limited to at least 1,000 miles, at least 2,000 miles, at least 3,000 miles, at least 5,000 miles, or at least 7,500 miles. In some embodiments, the composition may be removed from the engine oil system by removing the engine oil from the system and/or flushing the engine oil system with fresh engine oil.

In this patent, certain U.S. patents have been incorporated by reference. The text of such U.S. patents is, however, only incorporated by reference to the extent that no conflict exists between such text and the other statements and drawings set forth herein. In the event of such conflict, then any such conflicting text in such incorporated by reference U.S. patents is specifically not incorporated by reference in this patent.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those described herein, processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A method for treating an engine oil system, comprising: introducing a composition into the engine oil system, the composition comprising one or more engine oil system sealants, one or more fluids compatible with an engine oil of the engine oil system, and one or more light activated compounds, wherein the engine oil system sealant(s) inhibit one or more leaks of the engine oil system during use;
operating the engine oil system after introducing the composition into the engine oil system; and
directing activating light towards at least a portion of the engine oil system, wherein one or more of the light activated compounds are visible when treated with the activating light during use.

2. The method of claim 1, further comprising directing activating light toward at least a portion of the engine oil system after inhibiting one or more leaks detected during a previous inspection of the engine oil system.

3. The method of claim 1, wherein the activating light is ultraviolet light.

4. A kit, comprising:
a container comprising a composition, the composition comprising one or more fluids compatible with an engine oil of the engine oil system, one or more engine oil system sealants, wherein the engine oil system sealant(s) inhibit one or more leaks in the engine oil system; and one or more light activated compounds, wherein one or more of the light activated compounds are visible when treated with activating light, and wherein detection of the light activated compound indicates a position of one or more of the leaks in the engine oil system; and
an activating light source.

5. The kit of claim 4, further comprising an activating light source, wherein the activating light source comprises an ultraviolet light source.

6. The kit of claim 4, wherein at least one of the light activated compounds comprises a fluorescent compound.

7. The kit of claim 4, wherein at least one of the light activated compounds comprises a perylene.

8. The kit of claim 4, wherein the one or more engine oil system sealants comprise one or more phosphate esters.

9. The kit of claim 4, wherein the one or more engine oil system sealants comprise one or more alkyl phthalates.

10. The kit of claim 4, wherein the one or more engine oil system sealants comprise one or more esters.

11. The kit of claim 4, wherein the one or more engine oil system sealants comprise one or more triaryiphosphate esters.

12. The kit of claim 4, wherein the composition further comprises refined petroleum compounds.

13. The method of claim 1, wherein at least one of the light activated compounds comprises a fluorescent compound.

14. The method of claim 1, wherein at least one of the light activated compounds comprises a perylene.

15. The method of claim 1, wherein one or more of the light activated compounds remain substantially unchanged at temperatures of up to about 1000° C.

16. The method of claim 1, wherein the one or more engine oil system sealants comprise one or more phosphate esters.

17. The method of claim 1, wherein the one or more engine oil system sealants comprise one or more alkyl phthalates.

18. The method of claim 1, wherein the one or more engine oil system sealants comprise synthetic fibers.

19. The method of claim 1, wherein the one or more engine oil system sealants comprise one or more esters.

20. The method of claim 1, wherein the one or more engine oil system sealants comprise one or more triaryiphosphate esters.

21. The method of claim 1, wherein the composition further comprises refined petroleum compounds.

22. The method of claim 1, wherein the composition further comprises a surfactant.

* * * * *

UNITED STATES PATENT AND TRADEMARK OFFICE
CERTIFICATE OF CORRECTION

PATENT NO. : 7,565,830 B2  
APPLICATION NO. : 11/253078  
DATED : July 28, 2009  
INVENTOR(S) : Quest et al.

Page 1 of 1

It is certified that error appears in the above-identified patent and that said Letters Patent is hereby corrected as shown below:

In the Claims:

Claim 11, col. 10, line 31, please delete "triaryiphosphate" and substitute therefor -- triarylphosphate --.

Claim 20, col. 10, line 52, please delete "triaryiphosphate" and substitute therefor -- triarylphosphate --.

Signed and Sealed this

Sixth Day of October, 2009

David J. Kappos  
*Director of the United States Patent and Trademark Office*